United States Patent [19]

Beedle

[11] 4,004,317
[45] Jan. 25, 1977

[54] MOUNTING FOR SAPPHIRE BLADED TOOL

[75] Inventor: John H. Beedle, Belmont, Mass.

[73] Assignee: Kybe Corporation, Waltham, Mass.

[22] Filed: Sept. 5, 1975

[21] Appl. No.: 610,626

[52] U.S. Cl. .............................. 15/236 A; 15/93 R;
125/39; 156/257; 156/33 D
[51] Int. Cl.² ........................ B08B 1/02; G11B 3/58
[58] Field of Search ............ 15/93 R, 104 S, 236 R,
15/256.51, 256.52, 256.53; 29/103 R;
30/342; 125/38, 39; 156/257, 330

[56] References Cited

UNITED STATES PATENTS

| 1,797,026 | 3/1931 | Sharp | 29/103 X |
| 2,351,741 | 6/1944 | Booth | 125/39 |
| 3,114,973 | 12/1963 | Kennedy | 30/342 |
| 3,587,128 | 6/1971 | Gualtieri et al. | 15/93 R |
| 3,616,478 | 11/1971 | Martz et al. | 15/93 R |

FOREIGN PATENTS OR APPLICATIONS

| 1,064,784 | 9/1959 | Germany | 29/103 R |
| 5,469 | 3/1911 | United Kingdom | 30/343 |

OTHER PUBLICATIONS

Page 525 of British Plastics, Nov. 1948, of article entitled "Araldite."

*Primary Examiner*—Daniel Blum
*Attorney, Agent, or Firm*—Kenway & Jenney

[57] ABSTRACT

A prism-shaped sapphire blade is fixedly mounted in a mating groove of a holder by forming longitudinally extending opposed slots in the abutting faces of the blade and of the groove. A bonding material that sets up hard adhesively bonds the abutting surfaces and forms a key filling the opposed slots, to lock the blade in the holder.

10 Claims, 6 Drawing Figures

MOUNTING FOR SAPPHIRE BLADED TOOL

BACKGROUND OF THE INVENTION

This invention relates in general to precise mechanical mounting structures and methods for securing hard gem-like implements. More specifically, it relates to the secure mounting of a prism-shaped sapphire blade in a V-shaped groove of a holder.

It is known to use a sapphire blade for finish-scraping operations in a magnetic tape cleaning and reconditioning instrument; see for example U.S. Pat. Nos. 3,035,295; 3,587,128; and 3,616,478. Tools employing sapphire blades are also used for other scraping operations, as well as for cutting and like purposes. Sapphire is used in these industrial applications because it is extremely hard and dense, resists wear, holds a sharp edge, and in general has a long operational life in bladed tool. However, the relatively high cost of sapphire makes it desireable to form a sapphire blade in a shape that requires a minimum volume of the gem material per working edge. Further limitations on the configuration of a sapphire blade stem from the extreme hardness and brittleness of the material; the latter property renders sapphire implements prone to chipping and cracking, even during manufacture. In addition, industrial applications require that the blade be accurately positioned, and yet often be in a holder that can be readily removed and replaced.

Heretofore, as exemplified for example by tape cleaning instruments available from Kybe Corporation of Waltham, Massachusetts (the assignee hereof), the foregoing objectives for sapphire bladed tools were met by using a sapphire blade having a prism shape and by mounting the blade in a mating groove recessing the supporting holder. The edges of the blade are the two longitudinal edges of the prism which extend above the mounting groove. This arrangement provides two blade edges as desired, and the holder supports the blade to provide the requisite strength. Further, the prism shape requires only a relatively small amount of sapphire. For example, the quantity of sapphire required for a prism-shaped blade compares favorably with the quantity used in the more complexly configured sapphire blade disclosed in U.S. Pat. No. 3,616,478 of Martz et al (a bar-shaped blade with inflected sides).

Although a prism configuration offers these advantages, it has a significant shortcoming in that it is difficult to mount the blade securely in a holder with a high degree of reliability and at low production cost. The smooth converging surfaces of the prism configuration provide little, if any, anchorage for securing the blade to the holder. The prior practice has been to adhesively bond these abutting surfaces, Sapphire, however, is so dense, smooth and hard that it does not readily form adhesive bonds.

In an effort to establish a secure bond, the prior art has used adhesives set under considerable pressure of the prism blade into the mounting groove. However, the pressure levels used to form the bond often are sufficient to crack the sapphire, which completely destroys the blade. One manifestation of this problem has been that sapphire prism blades have heretofore been restricted to relatively short lengths, in the order of two and one half inches. Moreover, even when a seemingly satisfactory bond is achieved without cracking the sapphire, the bond is sufficiently unreliable to require destructive testing of each batch of blades thus mounted. If a bond fails upon such testing, the entire batch is discarded. Such test losses, as well as failures in use, substantially increase production costs and limit the effectiveness of employing sapphire bladed tools.

It is therefore a principal object of this invention to provide a mounting structure and method for a prism-shaped gem-like blade which is comparatively strong, reliable and inexpensive, and which does not subject the gem material to excessive forces or pressures.

Another object is to provide a mounting structure and method for a prism-shaped sapphire blade that accurately and permanently positions the blade in a holder. It is also an object that the mount positively lock the blade to the holder.

A further object is to provide a mounting structure and method of the above character that allows the mounting of sapphire and like gem blades having greater length than was heretofore considered economical.

Other objects of the invention will in part be obvious and will in part appear hereinafter.

SUMMARY OF THE INVENTION

A sapphire bladed tool according to the invention has a prism-shaped blade mountingly seated in a grooved holder and secured in place with a cast key that fills opposed recesses in the blade and in the the holder. One face of the prism protrudes above the holder so that the two prism edges along its side form working edges of the tool. The opposed recesses preferably are slots extending longitudinally of the prism shape of the blade. The cast key is formed by filling the recesses with conformable, typically plastic state, material that sets up to have high shear strength. The resultant solid key thus anchors the blade to the holder with a positive engagement.

A material with adhesive properties preferably as used to form the key for the purpose, in addition, of adhesively bonding the contiguously abutting surface portions of the blade and the holder.

The invention thus stems from the realization that a prism-shaped blade of sapphire and similar gem-like material can be recessed with longitudinal slots, or the like and a key cast in the slots thus formed to secure the blade to mating slots in a holder. Bladed tools embodying the invention can be made at less cost than was previously considered possible, can be made with significantly longer blades than previously, and are significantly more reliable with regard to the mounting of the blade.

The invention is further described herein with specific reference to a blade of sapphire for a magnetic tape cleaner, where, as is known, the blade scrapes the tape with a cleaning and finishing operation. The invention, however, can be used with other tools having blades of sapphire and other gem-like materials of prismatic or like configuration.

BRIEF DESCRIPTION OF THE DRAWINGS

For a fuller understanding of the nature and objects of the invention, reference should be made to the following detailed description and the accompanying drawings, in which.

DETAILED DESCRIPTION OF THE PREFERRED EMBODIMENTS

Figure 1:
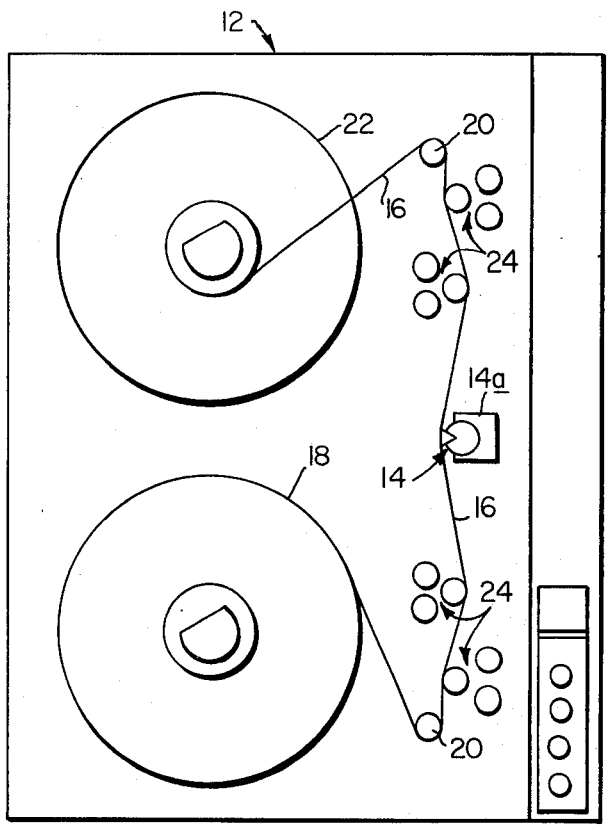
FIG. 1 is a front elevation view of a magnetic tape cleaner which incorporates a prism-shaped scraping blade of sapphire mounted in accordance with the invention.

FIG. 1 shows a magnetic tape cleaning and rewinding instrument 12 which has a bladed tool 14. Instruments of this type are commercially available to clean, condition and inspect reels of magnetic tape used for the computer storage of information in digital form. The tape is held on a supply reel 18 and directed over various capstans 20 and cleaning devices 24 to a take-up reel 22. Cleaning and conditioning is performed principally by a series of automatically advancing tissues in the cleaning devices 24 and by the bladed tool 14, which engages the tape with a scraping action for removing nodules and particulate matter from its surface.

Figure 2:
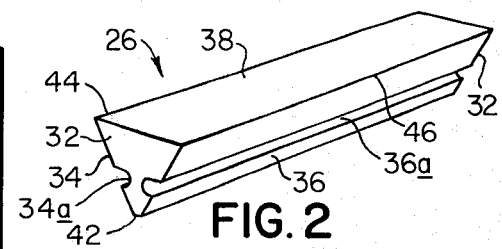
FIG. 2 is a perspective view of a prism blade embodying features of the invention and for use in the cleaner of FIG. 1.
Figure 3:
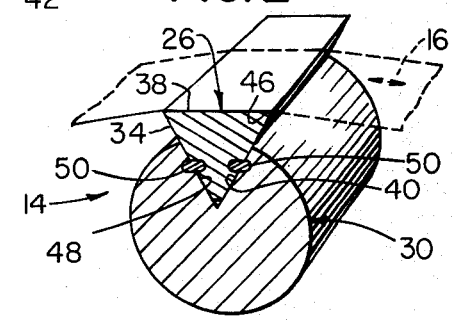
FIG. 3 is a perspective view, partly broken away, of the scraper unit of the cleaner of FIG. 1 and incorporating the blade of FIG. 2.
Figure 4:
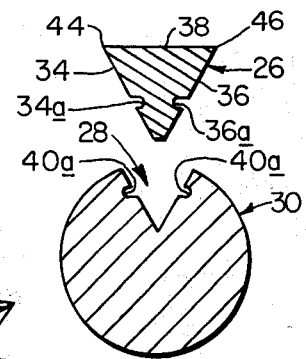
FIG. 4 is an exploded view corresponding to FIG. 3.

With reference to FIGS. 2–4, the illustrated bladed tool 14 has a generally triangular prism-shaped sapphire blade 26 mounted in a mating V-shaped groove 28 that recesses the side of a cylindrical holder 30. The blade 26 has a pair of mutually parallel, generally triangular end surfaces 32 and prism faces 34 and 36 extending between the end surfaces and which rest partially in the groove 28 in contiguous abutment with the groove side-walls 40. A top prism face 38 is directed away from the holder. The lower corner or edge 42 of the prism 26, defined by the intersection of faces 34 and 36, is flattened to ensure that the prism side faces 34 and 36 seat firmly in the groove 28. In contrast, each upper corner 44 and 46, defined by the intersection of faces 34 and 38 and by the intersection of faces 36 and 38, respectively, provides a highly uniform, knick-free sharp scraping edge. Each of these edges performs the desired scraping to clean and finish the tape surface as the tape 16 is drawn against that edge, as FIGS. 1 and 3 illustrate. More particularly, as the tape advances in either direction across the blade 26, it approaches one of the scraping edges at an angle suitable to generate a "plowing" action. The tape then passes over the face 38 and is wiped by the other scraping edge as it leaves the blade.

The illustrated blade holder 30, shown in FIGS. 1, 3 and 4, is a cylindrical block at least as long as the blade 26 and recessed along the full length of its cylindrical surface with a groove 28. The holder slidably fits, in a removable and replaceable manner, within a mount 14a on the instrument 12, as FIG. 1 shows. The groove 28 is configured, as shown, to matingly receive the blade 26, typically with about two-thirds of the width of the prism faces 34 and 36 nested within the groove in contiguous abutment with the groove walls 40—40.

With further reference to FIGS. 2, 3 and 4, the improvement which the invention provides is to recess the opposed surfaces of the blade and of the holder, and to cast a key 50 bridged between and filling each set of opposed recesses. Each key positively engages both the blade and the holder and thereby securely fixes the blade to the holder. This structure for mounting the wedging faces of the blade to a holder is less costly than prior practices, provides accurate positioning of the blade, and is rugged and reliable.

The illustrated key-receiving recesses in the blade 26 and in the holder 30 are slots 34a and 36a in the prism faces 34 and 36, and slots 40a in the groove walls 40. Each slot in the prism extends the full length between the end surfaces 32—32, and is aligned parallel to the edges 44, 46. Because of the extreme hardness of sapphire, the slots 34a, 36a are machined with a diamond saw or other technique for shaping hard materials. Each slot 34a, 36a preferably is located laterally on the faces 34 and 36 at approximately two-thirds of the distance from the scraping edge 44 or 46 to the bottom edge 42. This lateral location has been found satisfactory to minimize fracturing of the relatively brittle sapphire prism 26 at the narrowed region intermediate the slots.

Similarly, each holder slot 40a typically extends the full length of the holder 30 and is positioned laterally along each wall to be opposite to the slot 34a or 36a when the prism 26 is fully seated in the groove 28. The grooves 50 can be formed by techniques conventional for shaping the metal, plastic or other material of the holder 30.

As FIG. 3 shows, the blade 26 is secured to the holder 30 by applying a bonding material, such as an epoxy adhesive, in a thin layer to the abutting portions of the faces 34 and 36 and the groove walls 40, and to fill the slots 34a, 36a and 40a—40a. Depending on the bonding material selected, it can be applied to only one member, e.g. the holder, in sufficient quantity to fill all slots and coat all abutting surfaces. The blade is seated in the groove 28 to establish a thin adhesive bonding layer 48 between the abutting surfaces of the blade and the groove and simultaneously form a key 50 of the material in each pair of opposed slots 34a–40a and 36a–40a. Each key 50 preferably is continuous and completely fills each pair of slots. The blade and holder generally are clamped together with the pressure appropriate for the bonding material, and for providing the desired thickness of the bonding layer.

When the adhesive cures, it provides a strong, reliable anchorage of the blade to the holder. In particular, the keys 50—50 have high shear strength and therefore lock the blade 26 to the holder, even under test conditions exceeding normal operating forces. Besides offering some degree of bonding, the layer 48 fills any irregularities in the abutting surfaces which might otherwise allow the blade to shift relative to the holder.

It should now be understood that the slots 34a, 36a, and 40a are preferred representations of recesses in general which have surfaces extending transverse to the height of the blade and against which the key 50 can bear to lock the blade from being lifted or raised upward out of the holder. Further, although opposed slots or other recesses as illustrated are considered preferable, one member, e.g. the holder, can have protrusions that fit within the slots or other recesses of the other member, e.g. the blade. Even with such an interfitting recess — protrusion structure, the bonding material fills the recessed space between the members and hence sets up to form a key-like structure locking them together.

The bonding material is a hard setting adhesive which is initially in a readily deformable, i.e. plastic, state and hardens to have high shear strength. A two-part epoxy cement is considered a preferred bonding material.

Figure 5:
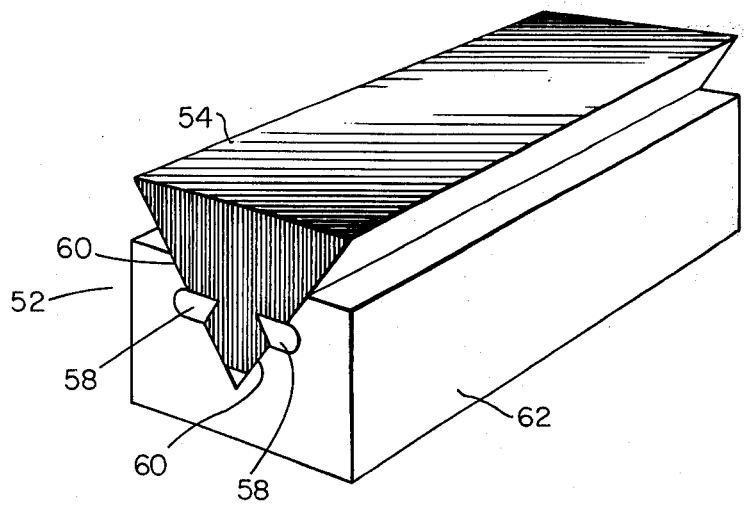
FIGS. 5 and 6 are, respectively, perspective and exploded transverse sectional views of another bladed tool having a prism-shaped gem-like blade mounted in accordance with the invention.
Figure 6:
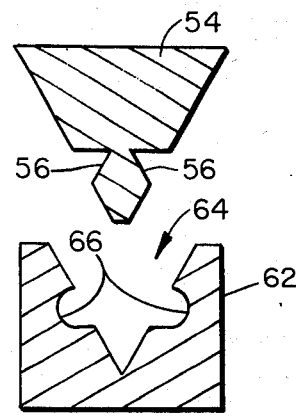

FIGS. 5 and 6 illustrate, by way of example, another configuration of the invention in which a bladed cartridge 52 has a prismatic blade 54, the sides of which are recessed with slots 56—56, secured by a pair of cast keys 58—58 and a thin bonding layer 60 of initially plastic and settable epoxy to a soft aluminum block or adapter 62 having the general configuration of a rectangular bar. A groove 64 that conforms to the facing sides of the blade recesses the block 62 and is, in turn, recessed with slots 66—66 that oppose the blade slots and hence communicate therewith.

By way of illustration, a typical sapphire blade per FIGS. 2–4 or 5 and 6 for use in a magnetic tape cleaning and rewinding apparatus has a length of approximately 2 inches and a face width of approximately 3/16 inch. In a blade of this size, each slot has both a width and depth in the range of 1/64 inch to 1/32 inch, and preferably in the range of .015 to .020 inch. The slots in the holder have similar dimensions. Although the configuration of the slots are shown in the drawings as being V-shaped and generally semicylindrical, the configuration is not a critical factor and therefore can be governed by the availability or requirements of the fabricating tools or techniques used to form the slots.

The foregoing detailed description and the accompanying drawings have therefore described a low cost, reliable and effective method for mounting a prism-shaped gem like blade in a mating groove of a holder. The mounting structure and process do not require the application of excessive pressures to the blade, or a high level of skill on the part of the assembler. In addition, the mounting structure and method described herein allow bladed tools to utilize a blade of triangular or like wedge-configured cross-section of greater length than heretofore practiced.

It will thus be seen that the objects set forth above, among those made apparent from the preceding description, are efficiently attained. Since certain changes may be made in carrying out the above method and in the construction set forth without departing from the scope of the invention, it is intended that all matter contained in the above description or shown in the accompanying drawings shall be interpreted as illustrative and not in a limiting sense.

Having thus described the invention, what is claimed as new and secured by Letters Patent is: shear-resistant

1. A scraping device for cleaning magnetic tape comprising, in combination,
    A. a triangular prism-like sapphire blade elongated between generally triangular end surfaces and having first, second and third faces extending between the end surfaces, and having scraping edges formed at the intersections of said third face with said first face and with said second face, said first and second faces each being recessed with a slot extending longitudinally between said end surfaces with the sides of the slot being spaced from the edges of the blade face,
    B. a holder having a generally V-shaped groove and seatingly receiving said blade in said groove with said first and second faces in substantially contiguous abutment with the sides of said groove, each wall of said groove being recessed with a longitudinally extending slot located opposite and in communication with the slot in the contiguous face of said blade, and
    C. a key filling each pair of opposed slots in said blade and in said groove to secure said blade in said holder, said key being formed of material applied in a conformable state to fill said slots and set to a substantially rigid shear-resistant state.

2. A scraping device according to claim 1 further comprising means adhesively bonding portions of said first and second prism faces to opposed areas of said groove.

3. A scraping device according to claim 2 wherein said bonding means and said key are an epoxy adhesive.

4. A scraping device according to claim 1 wherein said scraping edges and said slots formed in said first and second faces are substantially parallel and said slots in said faces are located approximately two-thirds of the distance from said scraping edges to the line of intersection of said first and second faces.

5. A method of mounting a triangular prism-like sapphire blade elongated between generally triangular end surfaces and having first, second and third faces extending between the end surfaces, in a holder having a V-shaped groove adapted to seatingly receive the blade with portions of the first and second faces in contiguous abutment with the sides of the groove, and with the generally parallel blade scraping edges as defined by the intersections of the third face with the first face and with the second face spaced from the holder, said method comprising the steps of
    A. forming, in each of said first and second faces, a slot extending longitudinally between said triangular end surfaces and with the sides of the slot spaced from the edges of the blade face,
    B. forming, in each side of said groove, a slot extending along said groove and located opposite the slot in the abutting face of said blade, and
    C. casting a key of initially conformable material that fills each pair of opposed slots and sets to a shear-resistant state.

6. A method as defined in claim 5 comprising the further step of adhesively bonding portions of said first and second faces to opposed areas of said groove.

7. A method as defined in claim 6 wherein said bonding and said casting steps include applying an epoxy adhesive to said opposed surface portions and to said slots.

8. In a sapphire-bladed scraping tool having
    i. a triangular prism-like sapphire blade having first, second and third prism faces longitudinally coextensive with one another, substantially parallel end faces and having first and second scraping edges at the intersections of said third face with each of said first and second faces, respectively, and
    ii. an elongated holder mounting said blade with said first and second faces thereof seatingly received in a groove recessing said holder, the improvement comprising
        A. means forming opposed, longitudinally extending recesses in said first prism face and in the opposed groove wall, and in said second prism face and in the groove wall opposite thereto, said recesses having sides spaced from the longitudinal edges of the blade faces and of the groove walls, and
        B. shear-resistant key means cast in place filling said recesses and bridging thereat between said opposed faces and walls.

9. In a tool according to claim 8, the further improvement comprising means adhesively joining opposed areas of said faces and groove walls, said joining means being the same material as said cast key means.

10. In the manufacture of a sapphire-bladed scraping tool having
i. a triangular prism-like sapphire blade with first, second and third prism faces longitudinally coextensive with one another, substantially parallel end faces and with first and second scraping edges at the intersections of said third face with each of said first and second faces, respectively, and
ii. an elongated holder mounting said blade with said first and second faces thereof seatingly received in a groove recessing said holder, the improvement comprising the steps of
A. oppositely longitudinally recessing said first prism face and the opposed groove wall, and said second prism face and the groove wall opposite thereto,
B. forming said opposed recesses with sides spaced from the longitudinal edges of the blade faces and of the groove walls, and
C. casting a key filling said opposed recesses and bridging thereat between said opposed faces and walls.

* * * * *

UNITED STATES PATENT AND TRADEMARK OFFICE
CERTIFICATE OF CORRECTION

PATENT NO. : 4,004,317
DATED : January 25, 1977
INVENTOR(S) : John H. Beedle

It is certified that error appears in the above-identified patent and that said Letters Patent are hereby corrected as shown below.

Column 1, line 54, after "surfaces" change "," to --.--.

Column 5, line 48, after "is:" delete "shear-resistant".

Signed and Sealed this

Thirty-first Day of January 1978

[SEAL]

Attest:

RUTH C. MASON
Attesting Officer

LUTRELLE F. PARKER
Acting Commissioner of Patents and Trademarks